Dec. 3, 1963  E. J. CATOR  3,112,767
QUICK-CONNECT COUPLING
Filed Oct. 21, 1960  2 Sheets-Sheet 1

INVENTOR.
EDWARD J. CATOR
BY
*Fay & Fay*
ATTORNEYS

INVENTOR.
EDWARD J. CATOR
BY
*Fay & Fay*
ATTORNEYS

[Patent No.] 3,112,767
[Patented] Dec. 3, 1963

3,112,767
QUICK-CONNECT COUPLING
Edward J. Cator, Rochester, N.Y., assignor to Crawford Fitting Company, Cleveland, Ohio, a corporation of Ohio
Filed Oct. 21, 1960, Ser. No. 64,031
10 Claims. (Cl. 137—614.06)

This invention relates to connector or coupling means for joining or connecting the ends of conduits containing fluids of various types, said coupling means being readily operated to connect or disconnect the ends of said conduit by means of operating a sleeve or collar disposed on the exterior of the device, coupling devices of this type being sometimes referred to as quick-connect coupling devices. More specifically, the invention relates to quick-connect coupling devices, including double shut-off valve means, operating to automatically shut off the fluid in said conduits upon operating said coupling device, such shutting off of the fluid in the conduits occurring prior to the completion of the uncoupling operation, whereby the pressure in the lines is maintained.

The use of coupling or connecting devices for connecting the end of tubes carrying fluid under pressure is well known in the art and has many applications throughout industry and frequently such devices are provided with a sleeve or collar disposed around the outer periphery thereof by means of which the two ends of the tubes may be coupled and uncoupled by relatively simple movements of such collars and sleeves. Conventional types of connector and coupling devices include a male and a female member, usually positioned and arranged in such manner that the coupling mechanism is disposed on both the male and the female members which results in relatively high manufacturing costs, particularly with reference to the cost of assembling the parts.

I have discovered that by disposing all of the moving coupling parts on the male member, a substantial saving in the assembling operation can be effected and such device can be quickly and easily operated by a simple push-pull one hand operation. I have also discovered that by providing certain valve or shut-off means in the ends of the male and female members, the ends of the lines will be sealed or shut off before the mechanical decoupling operation is completed, or, in other words, the sealing means will fully seat and seal before the members are finally disconnected. This provides means whereby there is no appreciable drop in the line when the decoupling operation occurs.

Therefore, an object of this invention is to provide a new and improved device for connecting or coupling together ends of tubes having fluid under pressure contained therein, said means being quickly and easily operated to disconnect or decouple the tube ends by simple one-hand, push-pull operations performed on the outside of the device.

Another object of the invention is to provide a construction wherein all of the coupling parts are disposed on the male member thereby resulting in substantial savings in the cost of assembling the device.

Another object is to provide a simple and effective valve or shut-off mechanism automatically operated by the decoupling operation which automatically shuts off the ends of the lines prior to the completion of the decoupling operation.

A further object of this invention is to provide a coupling which prevents explosive pressure release during the disengagement of the coupling.

A further object of this invention is to provide a coupling or connecting device for tube ends which requires relatively few parts, is operated by relatively simple manual operations and is positive and sturdy in action and reliable in service.

These and other objects of the invention will appear during the course of the following specification.

In the drawing accompanying this specification:

Figure 1:
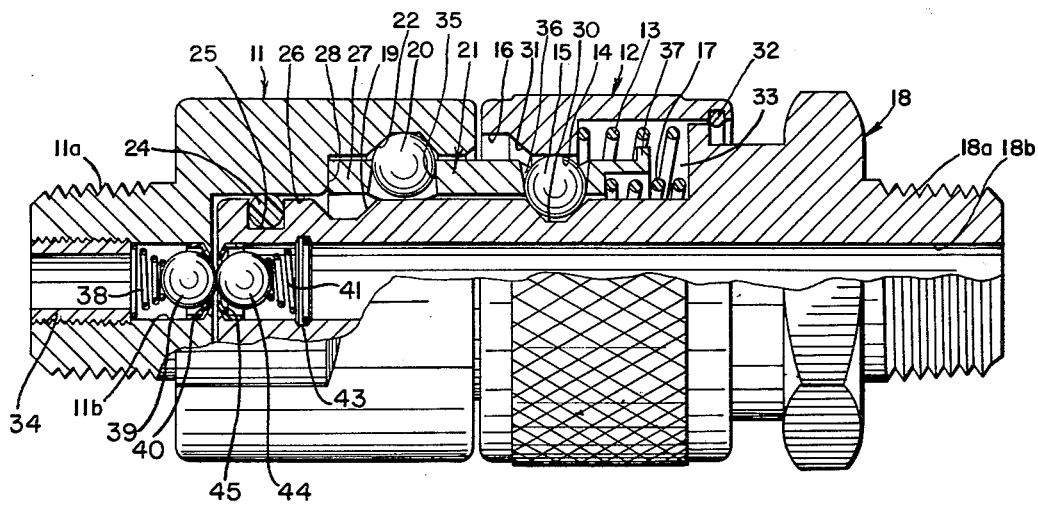
FIG. 1 is a view of an illustrative connector or coupling device in which the upper half of the view is taken in section and the lower half of the view is an elevational view illustrating the device in connected position.
Figure 3:
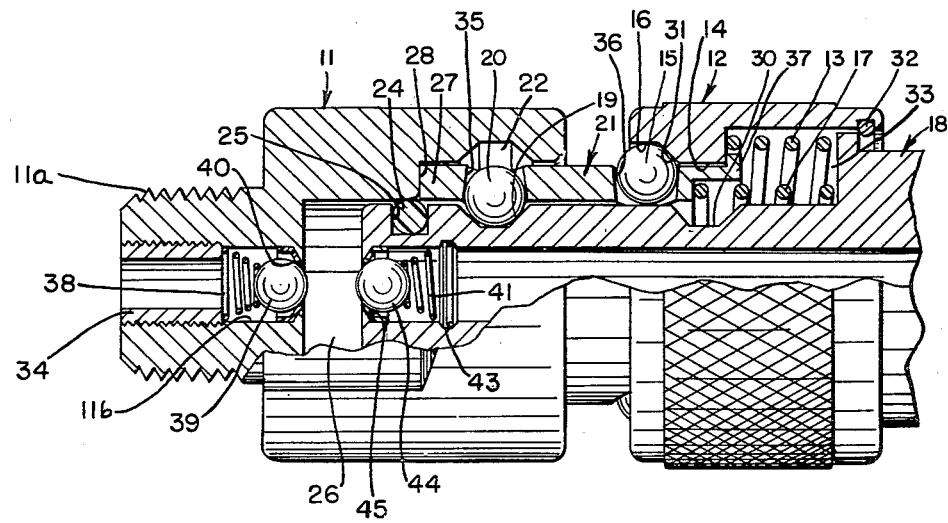
FIG. 3 is a somewhat similar view illustrating the position of the parts just prior to full disengagement.

The embodiment of the coupling device illustrated herein includes the female member 11 and a cooperating male member or stem 18 on which all of the sealing or locking members are disposed. The female member 11 is provided with threads 11a at its rearward end while the male member 18 is provided with outward threads 18a at its rearward end, said threaded portions being adapted to threadably engage the forward end of tubes in an obvious manner. The members 11 and 18 are provided with central bores 11b and 18b respectively. The forward end of the male member 18 is provided with an O-ring 24 disposed in an external annular groove 25 while a tapered detent groove 30 is disposed on the male member 18 rearwardly of the recess 25, and a second tapered detent groove 19.

A detent carrying sleeve 21 mounted around the mid-portion of the male member 18 at its forward end rests against a shoulder in a direction normal to the axis of the device. The detent carrying sleeve 21 is provided with tapered detent ball recesses 35, while rearwardly thereof tapered detent recesses are provided for retaining detent balls therein in a well known manner, the same being indicated by the numeral 36. Springs 13 and 17 urge the male member 18 away from the female member 11. The inner rearward end of the female member 11 is provided with an annular detent groove 22. A knurled operating sleeve 12 having a circumferential detent ball receiving groove 16 around its forward end is provided with a retaining spring 32. The spring 32 is retained in a circumferential bore 33 at the rearward end of the sleeve 12. A series of detent balls 20 are disposed at the forward end of the detent sleeve 21 while a series of similar detent balls 15 are disposed on the sleeve 21 rearwardly thereof. The structure thus far described herein relates primarily to the coupling structure of the device.

The coupling device is illustrated in FIG. 1 in its connected position and in order to disconnect the coupling the knurled operating sleeve 12 is moved to the right as viewed in the figures against the force of the spring 13 to the point where the smaller bore 14 of the sleeve is no longer over the ball detents 15 thereby permitting said detents to move outwardly to the larger bore 16. Under the pressure of the springs 13 and 17, the male member 18 will move away from the female member 11 to a position wherein the annular detent groove 19 is under the detent balls 20. Upon further movement of the operating sleeve 12 to the right, it will engage the shoulder 37 on the detent carrying sleeve 21 and carry the latter in the same direction, the ball detents 20 being moved inwardly along the tapered surface of the internal annular groove 22 in the female member 11. When the parts are in this position, the coupling will disengage readily.

To perform the coupling operation, the forward end of the male member 18 having the O-ring 24 disposed in an external annular groove 25 is moved into the internal bore 26 of the female member 11, said O-ring providing a leakproof seal between the female member 11 and the male member 18. After the forward end surface 27 of the detent carrying sleeve 21 is in bodily contact with the shoulder 28 on the female member 11, due to the fact that said surface is normal to the axis of the body, the force applied to the male member 18 in a direction to the left as viewed in the drawings and acting against the springs 13 and 17, will result in an outward movement of the detents 20 into the recesses 22 of the member 11 by a force applied to said detents 20 in contact with the tapered surface of the annular groove 19 in the male member 18. Further movement of the male member 18 in the same direction will bring it to a position where the annular groove 30 receives the detents 15, which will move inwardly by a force applied to said detents through bodily contact with the tapered internal surface 31 of the operating sleeve 12, said force being originated by the coil spring 13 and said force moving said sleeve 12 to the position where the internal bore 14 of said sleeve is over the detents 15, said sleeve being restricted from further movement by the retaining spring 32 located in the recessed bor 33 of the operating sleeve 12.

The female member 11 of my coupling device carries a shut-off valve. This valve embodies a tubular member 34, threaded into the bore 11b. The inner end of this member serves as an abutment for the outer end of a tapered helical spring 38 whose inner end bears against a ball valve 39 which is forced into fluid-tight engagement with a resilient valve seat 40 mounted in the open end of the bore 11b.

A similar shut-off valve is disposed within the bore 18b of the male member 18. It embodies a tapered helical spring 41 whose inner end abuts in an annular groove 43. The outer end of the spring 41 bears against a ball valve 44 which is accordingly forced into fluid-tight engagement with a resilient valve seat 45 mounted in the open end of the bore 18b.

As long as the male and female members are not connected the ball valves 39 and 44 will engage the valve seats 40 and 45 and maintain the full pressure of the fluid in these members. In the final axial coupling movement between the male and female members engagement of the ball valves, which project beyond the open ends of bores 11b and 18b, will occur. Completion of the coupling movement will force the ball valves off the valve seats against the pressure of the springs. Fluid may then flow from one coupling member to the other.

In disengaging the male and female parts the release occurs in a two-stage action to prevent explosive uncoupling. The first stage in the uncoupling occurs when the actuating sleeve 12 is moved to the right in FIG. 1, thus compressing the spring 13. When the sleeve 12 has been moved a sufficient distance to the right, surface 14 becomes disengaged from the detents 15 and the detent receiving groove 16 becomes juxtaposed with respect to the detents 15, thereby freeing them to move radially outwardly.

Figure 2:
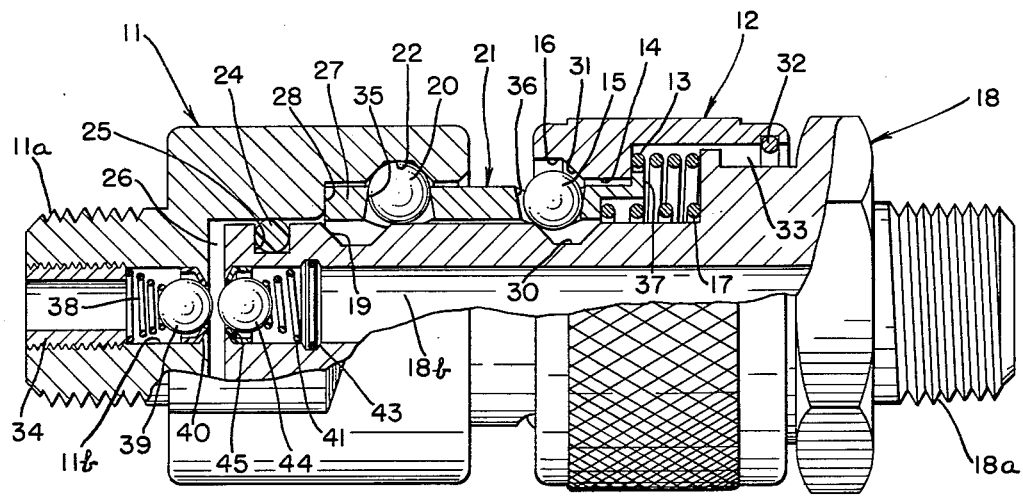
FIG. 2 is a view similar to FIG. 1 showing an intermediate stage in the uncoupling process.

The compression of the springs 13 and 17 urges the male member 18 to the right as seen in FIG. 2, thus camming the detents 15 radially outwardly into the circumferential detent receiving groove 16. Simultaneous with the movement of the male member 18 to the right relative to the female member, the ball valves 39 and 44 seat against the valve seats 40 and 45, thereby cutting off flow though the coupling. This completes the first step of the release operation.

At this moment the male and female members are still locked together by reason of the engagement of the series of detent balls 20 and an annual detent groove 22. Further movement of the detent 18 to the right allows the detents 20 to move from the internal annular groove 22 into the detent groove 19, provided in the male member 18, thereby allowing the total disengagement of the male and female members. Hence, the sealing of the open ends of the bores occurs almost simultaneously with the beginning of the uncoupling operation, so that before any release action of the second stage of the disengagement is begun, the valves 39 and 44 have closed, thus preventing any appreciable drop in line pressure.

The strength of the springs 13 and 17, their total strength and their strength in relation to one another, although important, can be manufactured subject to large tolerances. The spring constants, considering one in relation to the other, are not of a critical nature, and may have large tolerances. This is in comparison to other designs where a careful balance between two or more springs must be maintained to make the coupling operative. Thus, this coupling presents another demonstrative advantage over the disclosures of the prior art.

During initial uncoupling movement of the male and female members the pressure which prevents seating of the ball valves 39 and 44 against the valve seats 40 and 45 when the members are coupled is relieved and the springs 38 and 41 force the balls into fluid-tight engagement with the flexible valve seats.

The sealing of the open ends of the bores occurs almost simultaneously with the beginning of the uncoupling operation thereby preventing any appreciable drop in line pressure.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A coupling comprising male and female members, said female member having an inner shoulder and inner detent groove, said male member having outer axially spaced detent grooves, a slidable detent member having axially spaced detent openings carried by said male member, ball detents in said openings, a slidable sleeve mounted upon said detent and male members, said sleeve having a detent groove, a detent confining member, an inclined surface extending therebetween and a spring recess, and a spring disposed in said latter recess between said sleeve and said male member.

2. A coupling as set forth in claim 1 wherein said detent member is formed with a spring recess and a spring is confined in said recess and between said detent member and said male member.

3. A coupling as set forth in claim 2 wherein said detent member has a shoulder extending into said spring recess of said sleeve.

4. A coupling as set forth in claim 1 wherein said detent member has a shoulder extending into said spring recess of said sleeve.

5. A coupling as set forth in claim 4 wherein said detent confining member is adapted to engage said shoulder on said detent member and impart sliding movement thereto.

6. A coupling as set forth in claim 1 wherein said detent member abuts said shoulder in said female member when said male and female members are coupled.

7. A coupling as set forth in claim 1 wherein said sleeve has means engageable with said male member to limit movement of said sleeve in one direction.

8. A coupling comprising male and female members, a bore extending lengthwise through each of said members, the bore of said female member having an inner shoulder and an inner detent groove, said male member having outer axially spaced detent grooves, fluid sealing means including valve seats in each bore at an end thereof, a slidable detent member having axially spaced detent openings carried by said male member, ball detents in said openings, a slidable sleeve mounted upon said detent and male members, said sleeve having a detent groove and means engageable with said male member to limit movement of said sleeve in one direction, said detent member having a spring recess and a spring disposed in said latter recess and abutting said detent and male members, valves and means biasing said valves into engagement with said valve seats, said valves being maintained out of engagement with said valve seats against the action of said biasing means only when said detent member abuts said shoulder in said female member and said male and female members are securely locked by means of said ball detents thereby to insure that said valves are closed when said ball detents are out of engagement with the inner detent groove of said female member.

9. The coupling of claim 8 wherein said valve seats are flexible.

10. The coupling of claim 8 wherein said valves are balls with a portion of said balls projecting externally beyond the end of said bores when in fluid sealing engagement with said valve seats.

References Cited in the file of this patent

UNITED STATES PATENTS

| | | |
|---|---|---|
| 2,473,973 | Scheiwer | June 21, 1949 |
| 2,648,553 | Ulrich | Aug. 11, 1953 |
| 2,660,456 | Meddock | Nov. 24, 1953 |
| 2,706,646 | Olson | Apr. 19, 1955 |
| 2,800,343 | Ulrich | July 23, 1957 |

FOREIGN PATENTS

| | | |
|---|---|---|
| 1,221,995 | France | Jan. 18, 1960 |
| 1,239,825 | France | July 18, 1960 |